United States Patent
Okuma

[11] Patent Number: 5,930,022
[45] Date of Patent: Jul. 27, 1999

[54] DRIVING CIRCUIT FOR ELECTRO-ABSORPTION OPTICAL MODULATOR

[75] Inventor: Yoshinori Okuma, Kawasaki, Japan

[73] Assignee: Fujitsu Limited, Kawasaki, Japan

[21] Appl. No.: 09/041,760

[22] Filed: Mar. 13, 1998

[30] Foreign Application Priority Data

Oct. 14, 1997 [JP] Japan ................................ 9-280047

[51] Int. Cl.$^6$ .............................. B02F 1/03; H04B 10/04
[52] U.S. Cl. ........................ 359/248; 359/181; 359/247
[58] Field of Search .................................. 359/248, 245, 359/181, 247

[56] References Cited

FOREIGN PATENT DOCUMENTS

| 8-316580 | 11/1996 | Japan . |
| 9-199778 | 7/1997 | Japan . |
| 9-246633 | 9/1997 | Japan . |
| 9-252164 | 9/1997 | Japan . |

*Primary Examiner*—Georgia Epps
*Assistant Examiner*—Margaret Burke
*Attorney, Agent, or Firm*—Staas & Halsey

[57] ABSTRACT

Disclosed is a driving circuit for an electro-absorption optical modulator for outputting intensity-modulated signal light by receiving carrier light from a light source and absorbing the carrier light in dependence upon a driving voltage. The driving circuit includes a driving unit for applying a pulsed driving voltage to an electro-absorption optical modulator, and a variable impedance unit connected in parallel with the electro-absorption optical modulator for matching impedance with respect to the driving unit. The impedance of the variable impedance unit is switched to one value when the driving voltage is applied to the electro-absorption optical modulator and to another value when the driving voltage is not applied to the electro-absorption optical modulator so as to match impedance with respect to the driving unit.

5 Claims, 7 Drawing Sheets

(1) INPUT Ip (2) REFLECTION FROM $Z_L$ (3) REFLECTION FROM DRIVING CURRENT SOURCE (4) VOLTAGE WAVEFORM AT $Z_L$ $2\tau pd$

DRIVING CIRCUIT FOR ELECTRO-ABSORPTION OPTICAL MODULATOR

BACKGROUND OF THE INVENTION

This invention relates to a driving circuit for an electro-absorption optical modulator. More particularly, the invention relates to a driving circuit for an electro-absorption optical modulator for outputting intensity-modulated signal light by receiving carrier light from a light source and absorbing the carrier light in dependence upon driving voltage.

A light transmitter intensity-modulates carrier light, which is output by a laser diode serving as a light source, in dependence upon the "1", "0" logic of a data signal and sends the intensity-modulated signal light to an optical transmission line. An electro-absorption optical modulator (referred to as an "EA modulator) is available as an external modulator for performing the intensity modulation. The EA modulator generates intensity-modulated signal light by absorbing carrier light in dependence upon applied voltage (i.e., driving voltage).

FIG. 4 is a block diagram showing the general construction of a light transmitter using an EA modulator as the optical modulator. The transmitter includes a laser diode (LD) 1 as the light source, a laser diode drive 2 for causing the laser diode to emit light at a constant intensity and including an ACC (Automatic Current Control) circuit, which regulates laser diode driving current to a constant current value, and an ATC (Automatic Temperature Control) circuit for regulating laser diode chip temperature to a constant temperature, an EA modulator 3 for intensity-modulating carrier light from the laser diode by the applied voltage (driving voltage) to effect a conversion to signal light, a modulating signal generating circuit 4 for outputting a pulsed modulating signal based upon "1"s and "0"s of the data signal (input signal IN) and applying the pulsed driving voltage to the EA modulator, an isolator 5 for sending the signal light, which is output by the EA modulator, to an optical fiber 6, and a terminating resistor 7 for applying the pulsed driving voltage to the EA modulator 3 on the basis of the pulsed modulating signal. The resistor 7 is for impedance matching with the modulating signal generating circuit 4 and is assumed to have a resistance of, e.g., 50 ohms.

The modulating signal generating circuit 4 is constituted by a differential-type switch and a constant-current source. More specifically, as shown in FIG. 5, the modulating signal generating circuit 4 includes FETs 4a, 4b in a differential pair whose source terminals are tied together and connected to a constant-current source 4c. The drain terminal of the FET 4a is connected to ground via a resistor R, the drain terminal of the FET 4b is connected to the EA modulator 3, an input signal IN is applied to the gate terminal of the FET 4a, and a signal *IN, which is the inverse of the input signal IN, is applied to the gate terminal of the FET 4b. If the input signal IN is logical "1", the FET 4a turns on, the FET 4b turns off at the same time and a constant current flows into the FET 4a via the resistor R. If the input signal IN is logical "0", the FET 4a turns off, the FET 4b turns on at the same time and a constant current flows into the FET 4b. Thus, a pulsed modulating signal is generated based upon the "1", "0" logic levels of the input signal. If FIGS. 4 and 5 are expressed in simplified form, the result is as shown in FIG. 6 (in which the isolator and optical fiber have been deleted).

FIG. 7 is a diagram useful in describing the operation of the circuit. A characteristic curve 11 represents the relationship between output power $P_0$ of the EA modulator 3 and voltage $V_{EA}$ applied to the EA modulator 3. It will be appreciated that the output power $P_0$ is approximately inversely proportional to the square of the applied voltage $V_{EA}$. If the applied voltage $V_{EA}$ is pulse-modulated at values at which the output power $P_0$ is maximized and at values at which the output power $P_0$ is approximately minimized, as indicated by the solid line 12 in FIG. 7, then a signal light intensity modulated as indicated at 13 is output by the EA modulator 3.

FIG. 8 shows an electro-absorption static characteristic illustrating the relationship between a photocurrent $I_{PH}$, which is produced by the EA modulator 3 owing to absorption of carrier light, and the applied voltage $V_{EA}$, as well as the relationship between the output power $P_0$ and the applied voltage $V_{EA}$. Here the applied voltage $V_{EA}$ is plotted along the horizontal axis while the signal light output $P_0$ and photocurrent $I_{PH}$ are plotted along the vertical axis. As described above in connection with FIG. 7, the output power $P_0$ of the signal light varies as indicated by a curve 11 as the applied voltage $V_{EA}$ varies. Further, the photocurrent $I_{PH}$ developed in the EA modulator 3 increases as indicated by curve 21 as the output power $P_0$ of the signal line decreases (i.e., as the amount of absorption of the carrier light increases). That is, if the applied voltage $V_{EA}$ is increased, light is absorbed, the output power $P_0$ decreases and the absorbed light appears as the photocurrent $I_{PH}$.

It should be evident from the electro-absorption static characteristic of FIG. 8 that photocurrent $I_{PH}$ is not linear in the relationship with the applied voltage $V_{EA}$. The photocurrent $I_{PH}$ presents a linear characteristic in the region in which the EA voltage $V_{EA}$ is less than $V_{EATH}$ (i.e., in the low-voltage region) and a saturated characteristic in the region in which the EA voltage $V_{EA}$ is greater than $V_{EATH}$ (i.e., in the high-voltage region). If this is considered in terms of the impedance of the EA modulator, the impedance is low in the low-voltage region where the EA voltage $V_{EA}$ is less than $V_{EATH}$ and high in the high-voltage region where the EA voltage $V_{EA}$ is greater than $V_{EATH}$.

The 50-ohm terminating resistor is connected in parallel with the EA modulator 3, as shown in FIGS. 4 through 6, and the EA modulator 3 performs pulse modulation while impedance is matched with that of the modulating signal generating circuit 4 by this resistor. If the EA modulator 3 is operating at high impedance, then impedance matching is achieved correctly. If the EA modulator 3 operates at low impedance, however, the impedance as seen from the modulating signal generating circuit 4 declines, impedance mismatching occurs and the waveform deteriorates.

FIGS. 9A and 9B are diagrams useful in describing waveform deterioration in a case where the aforesaid impedance mismatch has occurred. Here a pulsed current source Ip is terminated at an impedance $Z_L$ through a transmission line having an impedance $Z_0$ and exhibiting a propagation delay time of $\tau_{pd}$. The conditions which prevail when $Z_L<Z_0$ holds will be considered. The $Z_L<Z_0$ state represents the state of mismatched impedance. As a consequence, reflection is produced by the impedance $Z_L$ and by the pulsed current source Ip, as indicated by the waveforms (2), (3) in FIG. 9B, and the waveform of the voltage across the impedance $Z_L$ is as indicated by the waveform (4). Specifically, if impedance mismatch occurs, the waveform of the voltage cross the impedance $Z_L$ has steps on both sides owing to reflection.

The EA modulator 3 produces impedance mismatch if it operates at low impedance, as mentioned above. Consequently, a problem which arises is that an EA voltage waveform 12 whose waveform has deteriorated in the manner shown in FIG. 10 is applied to the EA modulator 3 so that the EA modulator 3 outputs signal light 13 the positive-going transition of which has a deteriorated waveform.

SUMMARY OF THE INVENTION

Accordingly, an object of the present invention is to arrange it so that impedance matching can be achieved even in a case where the EA modulator operates at both low and high impedances, thereby eliminating deterioration of the signal light waveform ascribed to impedance mismatch.

In accordance with the present invention, the foregoing object is attained by providing a driving circuit for an electro-absorption optical modulator, comprising a driving unit for applying a pulsed driving voltage (a pulsed modulating voltage) to an EA modulator, and a variable impedance unit connected in parallel with the EA modulator for matching impedance with respect to the driving unit, wherein impedance of the variable impedance unit is switched to one value when the driving voltage is applied to the EA modulator and to another value when the driving voltage is not applied to the EA modulator so as to match impedance with respect to the driving unit.

In this case, the driving unit is constituted by a constant-current source and a connection switching circuit, wherein (1) when the driving voltage is being applied, the constant-current source is connected by the connection switching circuit to a point at which the electro-absorption optical modulator and the variable impedance unit are connected in parallel with each other, and (2) when the driving voltage is not being applied, the constant-current source is disconnected from the point by the connection switching circuit. Further, the variable impedance circuit is constituted by a semiconductor device, such as a diode of FET, that is turned on and off in dependence upon whether the driving voltage is or is not being applied.

Other features and advantages of the present invention will be apparent from the following description taken in conjunction with the accompanying drawings.

DESCRIPTION OF THE PREFERRED EMBODIMENT (A) Embodiment

Figure 1:
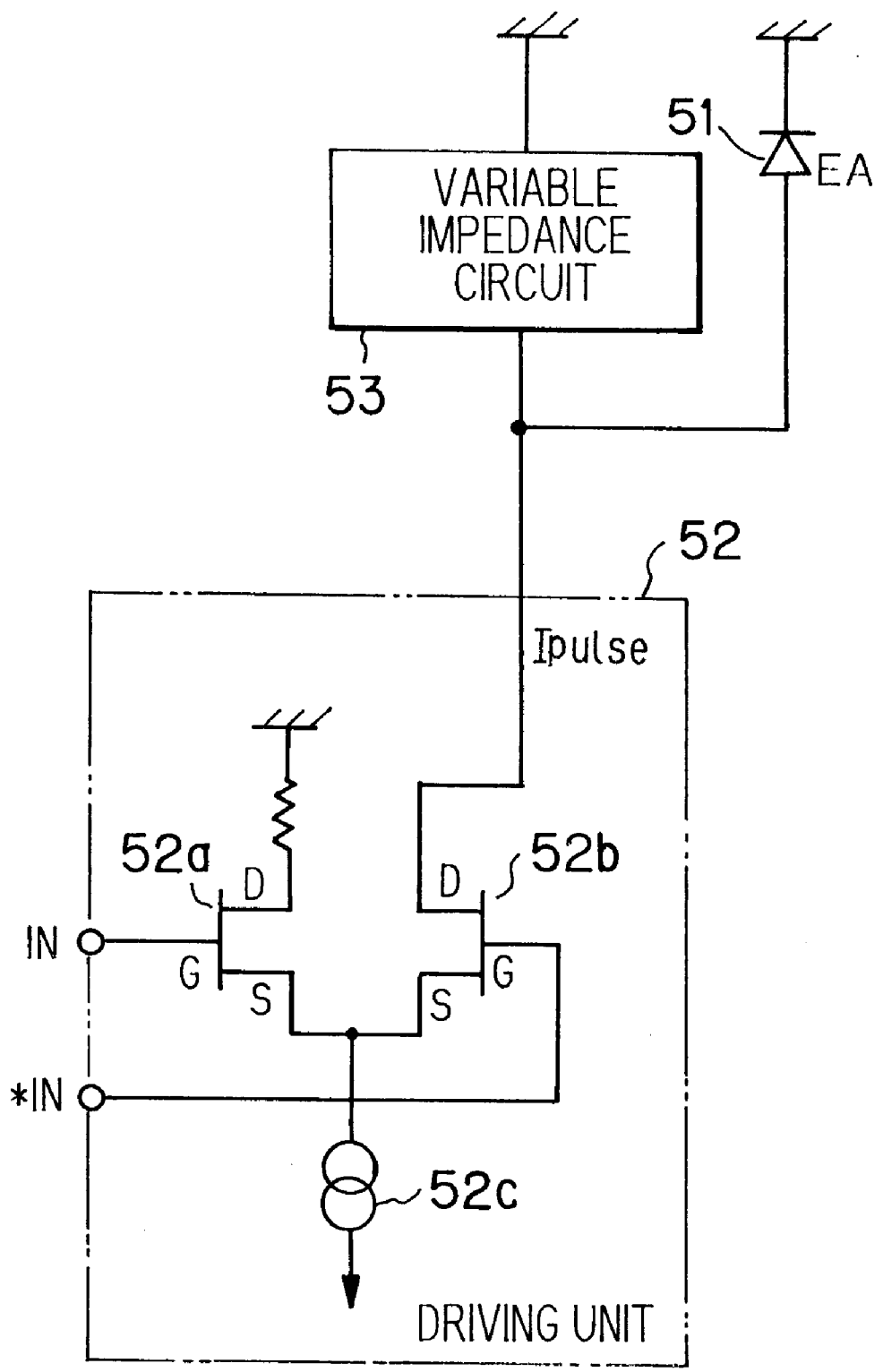
FIG. 1 is a diagram showing the construction of an EA driving circuit according to the present invention.

FIG. 1 is a diagram showing the construction of an EA driving circuit according to the present invention. The driving circuit includes a driving unit 52 for applying a pulsed driving voltage (pulsed modulating voltage) to an EA modulator 51, and a variable impedance circuit 53 connected in parallel with the EA modulator 51.

The driving unit 52 outputs a pulsed modulating signal (current pulses indicated by $I_{pulse}$) based upon the "1"s and "0"s of the data signal (input signal IN), and applies the pulsed modulating voltage to the EA modulator 51. The driving unit 52 is constituted by a switch having a differential construction and a constant-current source. More specifically, the driving unit 52 includes FETs 52a, 52b in a differential pair whose source terminals are tied together and connected to a constant-current source 52c. The drain terminal of the FET 52a is connected to ground via a resistor, the drain terminal of the FET 52b is connected to the EA modulator 51, the input signal IN is applied to the gate terminal of the FET 52a, and a signal *IN, which is the inverse of the input signal IN, is applied to the gate terminal of the FET 52b. If the input signal IN is logical "1", the FET 52a turns on, the FET 52b turns off at the same time, a constant current flows into the FET 52a and the current pulse $I_{pulse}$ is not produced. If the input signal IN is logical "0", the FET 52a turns off, the FET 52b turns on at the same time, a constant current flows into the FET 52b and the current pulse $I_{pulse}$ is generated. Thus, a pulsed modulating signal (the current pulses $I_{pulse}$) is generated based upon the "1", "0" logic levels of the input signal.

The variable impedance circuit 53 changes over impedance automatically depending upon whether the pulsed modulating voltage is or is not being applied to the EA modulator 51, thereby matching impedance with the driving unit 52 at all times. More specifically, the impedance of the variable impedance circuit 53 is varied by the EA voltage $V_{EA}$ so that impedance as seen from the side of the driving unit 52 is made 50 ohms at all times both in the low-voltage region (when the pulsed modulating voltage is not being applied) and high-voltage region (when the pulsed modulating voltage is being applied). As a result, waveform deterioration caused by impedance mismatch does not occur.

Figure 8:
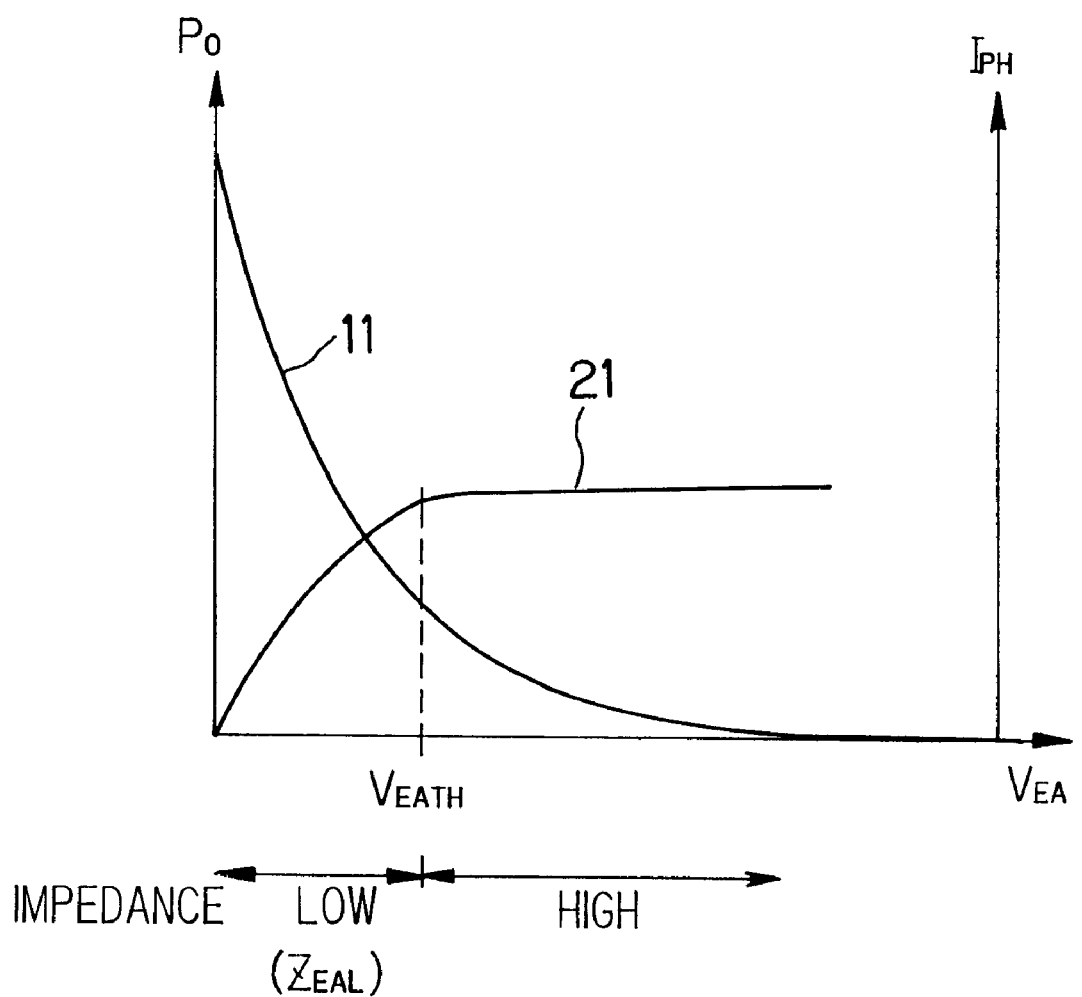
FIG. 8 is a diagram showing the static characteristic of an EA modulator.
Figure 9A:
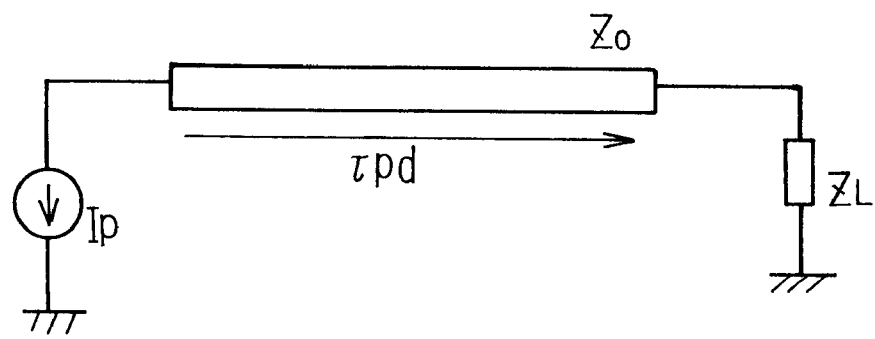
FIGS. 9A and 9B are diagrams useful in describing waveform deterioration caused by impedance mismatch.
Figure 9B:
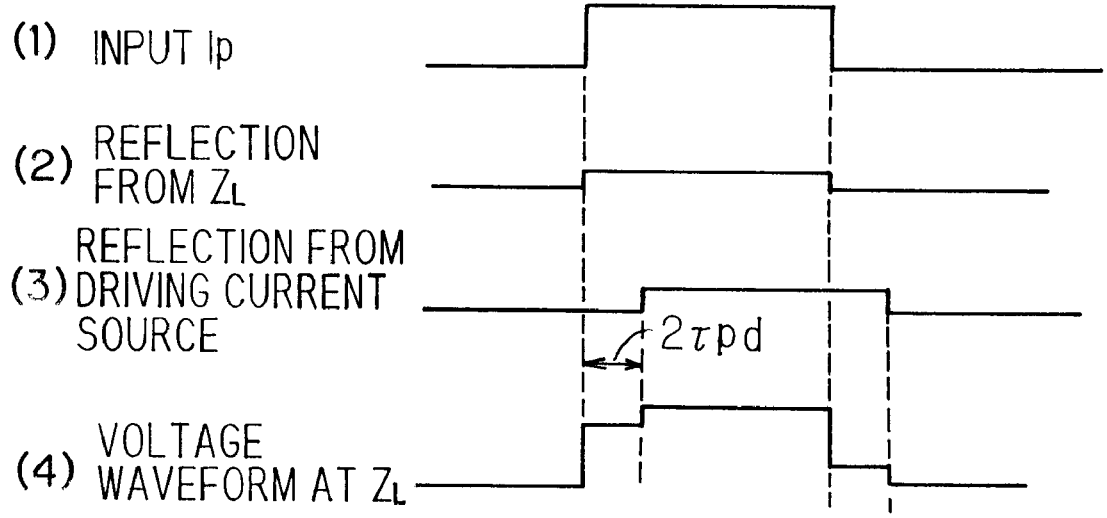
Figure 10:
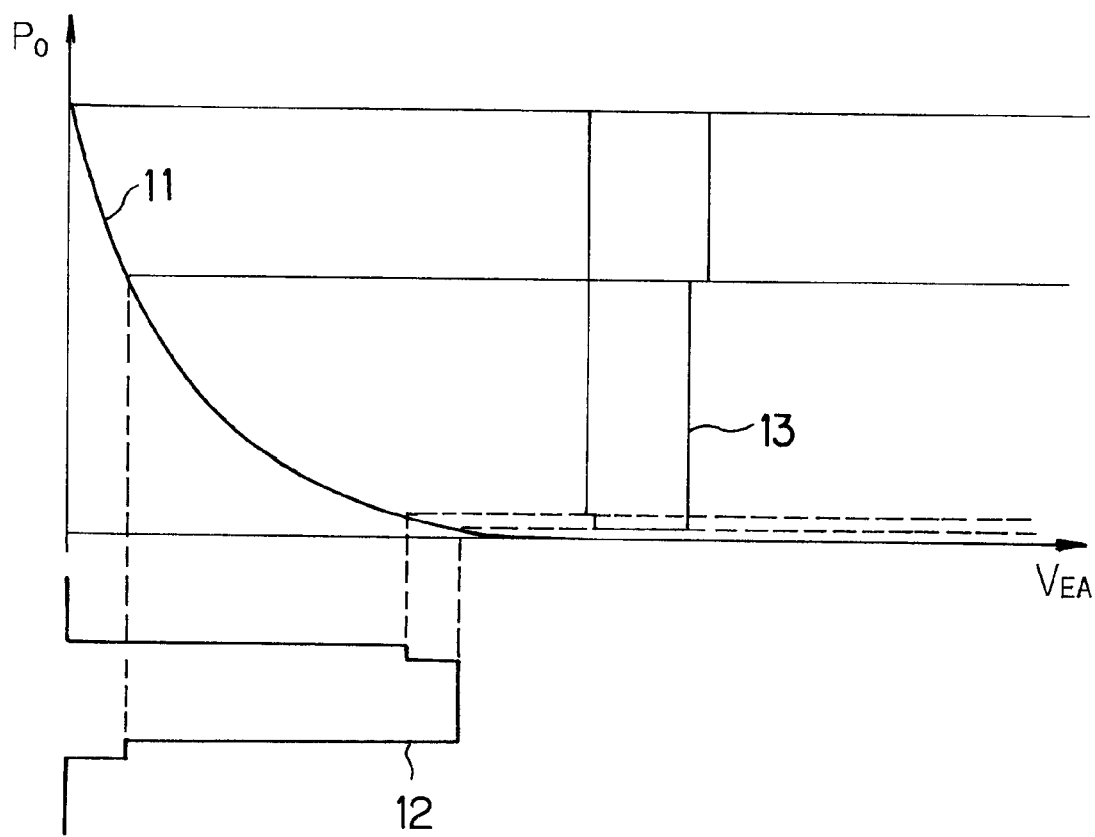
FIG. 10 is a diagram useful in describing deterioration of a signal light waveform at the time of EA drive.

As shown in FIG. 8, let $Z_{EAL}$ represent the impedance of the EA modulator 51 in the low-voltage region, $V_{EATH}$ the EA voltage which effects the changeover between high and low impedances, and Z the impedance of the variable impedance circuit 53 connected in parallel with the EA modulator 51. It is required to find values of the impedance Z of variable impedance circuit 53 necessary to achieve impedance matching in the low-voltage region where $V_{EA} < V_{EATH}$ holds and in the high-voltage region where $V_{EA} > V_{EATH}$ holds.

(a) Low-voltage region where $V_{EA} < V_{EATH}$ holds

In the low-voltage region where $V_{EA} < V_{EATH}$ holds, it is required that the resistance value of the parallel circuit composed of impedance Z of variable impedance circuit 53 and low impedance $Z_{EAL}$ of the EA modulator 51 be made equal to 50 ohms. Accordingly, we have $$50 = Z_{EAL} \cdot Z/(Z_{EAL} + Z)$$

Obtaining Z from this equation gives us $$Z = 50 \cdot Z_{EAL}/(Z_{EAL} - 50) \qquad (1)$$

Here $Z_{EAL}$ is already known since it is the impedance of the EA modulator 51 in the low-voltage region. In the low-voltage region, therefore, it will suffice to decide the impedance of the variable impedance circuit 53 in such a manner that the impedance value given by Equation (1) will be obtained.

(b) High-voltage region where $V_{EA} > V_{EATH}$ holds

In the high-voltage region where $V_{EA} > V_{EATH}$ holds, it is required that the resistance value of the parallel circuit composed of the impedance Z of variable impedance circuit 53 and the impedance of the EA modulator 51 be made equal to 50 ohms. Since the EA modulator 51 has a high impedance in this case, we have $$Z=50 \quad (2)$$

In the high impedance state, therefore, it will suffice to decide the impedance of the variable impedance circuit 53 in such a manner that the impedance value given by Equation (2) will be obtained.

Thus, if the variable impedance circuit 53 controls impedance to obtain the value indicated by Equation (1) in the low-voltage region in which $V_{EA} < V_{EATH}$ holds and to obtain the value indicated by Equation (2) in the high-voltage region in which $V_{EA} > V_{EATH}$ holds, the impedance as seen from the driving unit 52 can be made 50 ohms at all times and waveform deterioration due to impedance mismatch can be prevented.

(B) First embodiment of variable impedance circuit

Figure 2:
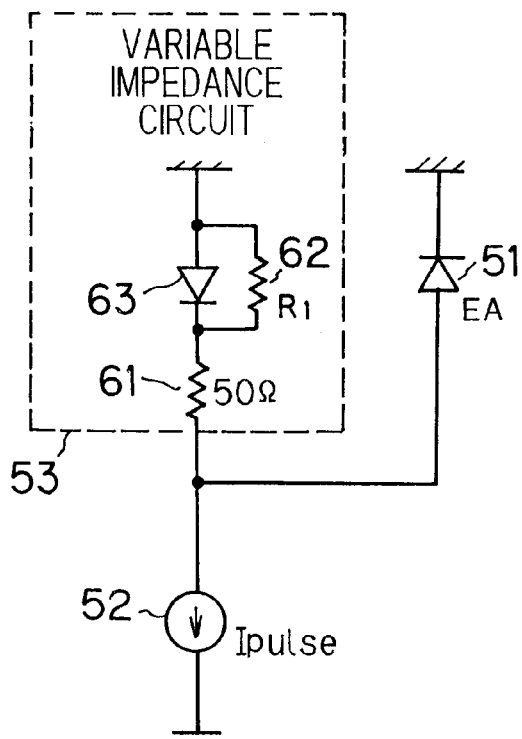
FIG. 2 is a diagram showing the construction of a variable impedance circuit.

FIG. 2 is a diagram showing the construction of a variable impedance circuit according to a first embodiment of the present invention. Components identical with those shown in FIG. 1 are designated by like reference characters.

The variable impedance circuit 53 includes a resistor 61 having a resistance of 50 ohms, a resistor 62 having a resistance of R1 ohms, and a diode 63 connected in parallel with the resistor 62. Thus, the variable impedance circuit 53 is constructed by connecting a parallel circuit comprising the diode 63 and resistor 62 in series with the 50-ohm resistor 61.

With the variable impedance circuit 53 thus constructed, the impedance Z of the circuit 53 takes on the values indicated below in the low-voltage region ($I_{pulse}=0$ mA) where $V_{EA} < V_{EATH}$ holds and in the high-voltage region ($I_{pulse}$=large value) where $V_{EA} > V_{EATH}$ holds.

(a) Low-voltage region ($I_{pulse}=0$ mA) where $V_{EA} < V_{EATH}$ holds

In the low-voltage region ($I_{pulse}=0$ mA) where $V_{EA} < V_{EATH}$ holds, the diode 63 turns off so that the impedance Z of the variable impedance circuit 53 becomes as follows:

$$Z=50+R1 \quad (3)$$

In the low-voltage region where $V_{EA} < V_{EATH}$ holds, the impedance Z for impedance matching is given by Equation (1). Accordingly, the following equation holds in view of Equations (1), (3):

$$50 \cdot Z_{EAL}/(Z_{EAL}-50)=50+R1$$

and from the above equation we have $$R1=50 \cdot Z_{EAL}/(Z_{EAL}-50)-50=50^2/(Z_{EAL}-50) \quad (4)$$

(b) High-voltage region ($I_{pulse}$=large value) where $V_{EA} > V_{EATH}$ holds In the high-voltage region ($I_{pulse}$=large value) where $V_{EA} > V_{EATH}$ holds, the diode 63 turns on. Since the internal impedance of the diode 63 is approximately 0 ohms, the impedance Z of the variable impedance circuit 53 becomes 50 ohms, satisfying Equation (2).

Thus, if the variable impedance circuit is constructed as shown in FIG. 2 and the resistance value R1 is decided so as to satisfy Equation (4), the impedance as seen from the driving unit can be made 50 ohms in both the low-voltage region ($I_{pulse}=0$ mA) where $V_{EA} < V_{EATH}$ holds and the high-voltage region ($I_{pulse}$=large value) where $V_{EA} > V_{EATH}$ holds, thereby eliminating mismatching of impedance so that deterioration of the signal light waveform can be prevented.

It should be noted that a voltage Vsw for the point at which switching between the low- and high-voltage regions occurs can be obtained as follows: Letting $\phi_B$ represent the ON voltage of the diode 63, a switching-point current Isw is obtained from the following equation:

$$I_{SW}=\phi_B/R1 \quad (5)$$

Accordingly, the EA voltage $V_{EA}$ (=Vsw) for the switching point is given by the following:

$$V_{SW}=I_{SW}\cdot(50+R1)=(\phi_B/R1)\cdot(50+R1) \quad (6)$$

where R1 in Equation (6) is a value decided by Equation (4).

Thus, the EA voltage $V_{EA}$ (=Vsw) for the switching point can be set at will by selecting diodes having different $\phi_B$ characteristics or by connecting several diodes serially.

(C) Second embodiment of variable impedance circuit

Figure 3:
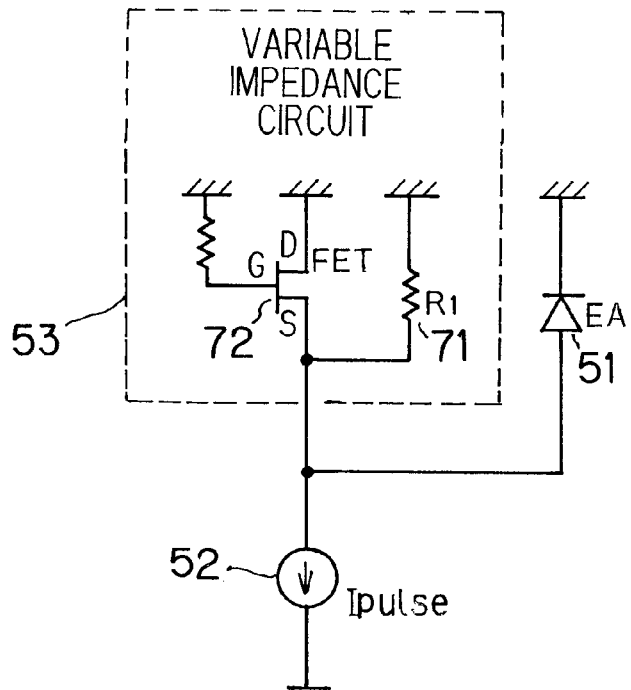
FIG. 3 is a diagram showing an alternative construction of a variable impedance circuit.
Figure 4:
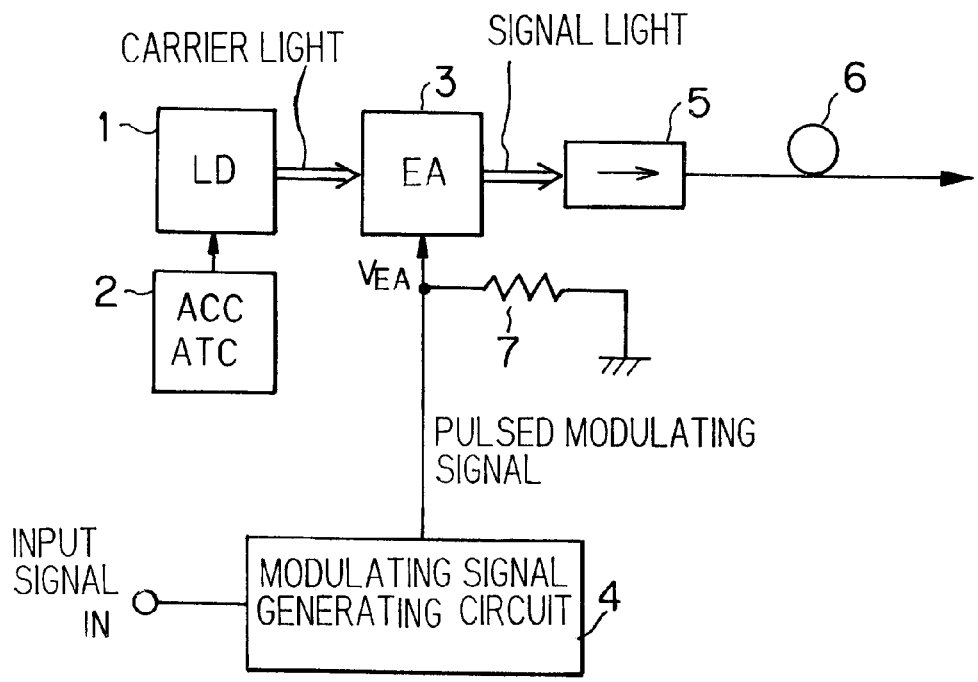
FIG. 4 is a block diagram showing the general construction of a transmitter.
Figure 5:
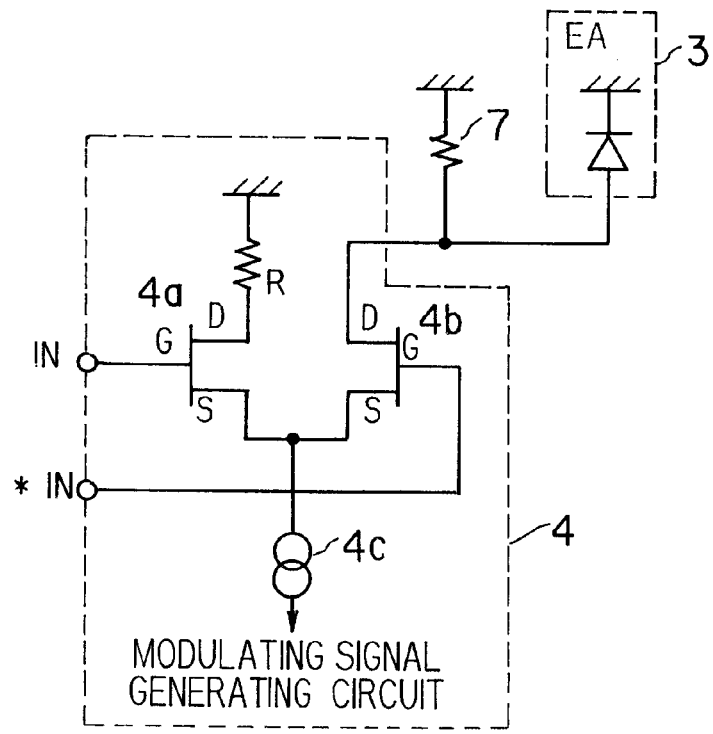
FIG. 5 is a diagram showing the construction of a modulating signal generating circuit.
Figure 6:
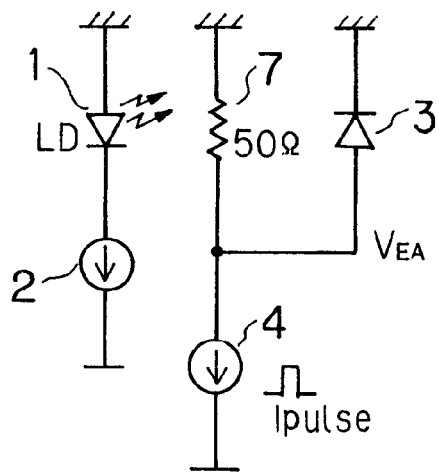
FIG. 6 is a simplified representation.
Figure 7:
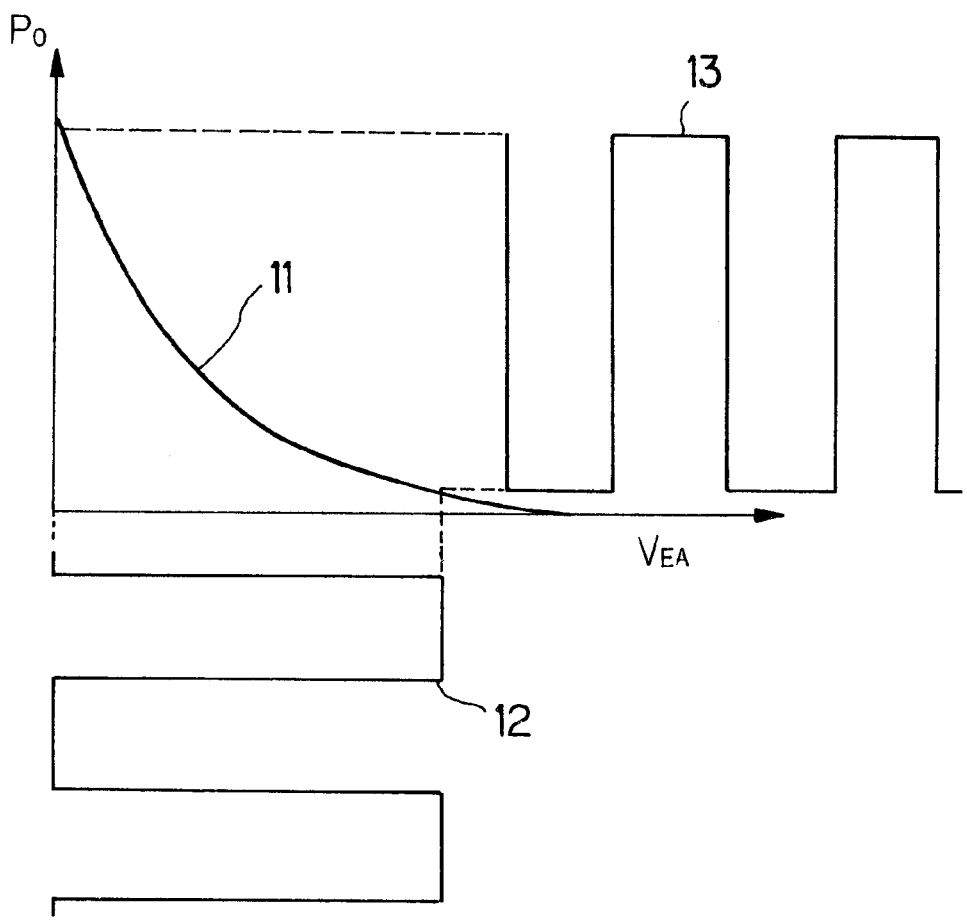
FIG. 7 is a diagram useful in describing a modulating operation.

FIG. 3 is a diagram showing the construction of a variable impedance circuit according to a second embodiment of the present invention. Components identical with those shown in FIG. 1 are designated by like reference characters.

Here the variable impedance circuit 53 includes a resistor 71 having a resistance of R1 ohms, and a FET 72 connected in parallel with the resistor 71. The gate and drain terminals of the FET 72 are connected to ground and the source terminal is connected to one end of the resistor 71 and to the anode side of the EA modulator 51.

With the variable impedance circuit 53 thus constructed, the impedance Z of the circuit takes on the values indicated below in the low-voltage region ($I_{pulse}=0$ mA) where $V_{EA} < V_{EATH}$ holds and in the high-voltage region ($I_{pulse}$=large value) where $V_{EA} > V_{EATH}$ holds.

(a) Low-voltage region ($I_{pulse}=0$ mA) where $V_{EA} < V_{EATH}$ holds

In the low-voltage region ($I_{pulse}=0$ mA) where $V_{EA} < V_{EATH}$ holds, the FET 72 turns off so that the impedance Z of the variable impedance circuit 53 becomes as follows:

$$Z=R1 \quad (7)$$

In the low-voltage region where $V_{EA} < V_{EATH}$ holds, the impedance Z for impedance matching is given by Equation (1). Accordingly, the following equation holds in view of Equations (1), (7):

$$R1=50 \cdot Z_{EAL}/(Z_{EAL}-50) \quad (8)$$

(b) High-voltage region ($I_{pulse}$=large value) where $V_{EA} > V_{EATH}$ holds In the high-voltage region ($I_{pulse}$=large value) where $V_{EA} > V_{EATH}$ holds, the FET 72 turns on, the impedance of the FET 72 becomes $1/g_m$ and the impedance Z of the variable impedance circuit 53 is given by the following:

$$Z=(1/g_m)\cdot R1/[(1/g_m)+R1)] \quad (9)$$

It should be noted that $g_m$ is the mutual conductance of the FET and is given by the following equation using drain current $I_D$ and gate-source voltage $V_{GS}$:

$$g_m = (dI_D/dV_{GS}) \text{ (where } V_{DS} \text{ is a constant)}$$

Thus, the mutual conductance $g_m$ is the slope of the transfer characteristic $I_D$-$V_{GS}$ at the operating point.

The impedance Z for impedance matching in the high-voltage region where $V_{EA} > V_{EATH}$ holds is given by Equation (2). Accordingly, the following equation holds in view of Equations (2), (9):

$$50 = (1/g_m) \cdot R1/[(1/g_m) + R1)] \qquad (10)$$

and from the above equation we have $$(1/g_m) = 50 \cdot R1/(R1-50) \qquad (11)$$

Thus, by making the resistance value R1 a value obtained by Equation (8) and using a FET having a $g_m$ which satisfies Equation (11), the impedance as seen from the driving unit can be made 50 ohms in both the low-voltage region ($I_{pulse} = 0$ mA) where $V_{EA} < V_{EATH}$ holds and the high-voltage region ($I_{pulse} =$ large value) where $V_{EA} > V_{EATH}$ holds, thereby eliminating mismatching of impedance so that deterioration of the signal light waveform can be prevented.

The foregoing relates to cases where the variable impedance circuit includes a diode or a FET. However, the variable impedance circuit can be constructed using a transistor or other semiconductor switch. For example, a transistor can be substituted for the diode in FIG. 2 and it can be so arranged that the transistor turns off in the low-voltage region where $V_{EA} < V_{EATH}$ holds and the high-voltage region where $V_{EA} > V_{EATH}$ holds.

Further, though it has been described that the resistance value for impedance matching is 50 ohms, this value does not impose a limitation upon the invention.

Thus, in accordance with the present invention, a driving circuit for an electro-absorption optical modulator includes a driving unit for applying a pulsed driving voltage (a pulsed modulating voltage) to an EA modulator, and a variable impedance unit connected in parallel with the EA modulator for matching impedance with respect to the driving unit, wherein the impedance of the variable impedance unit is switched when a voltage is and is not applied to the EA modulator so as to match impedance with the driving unit. As a result, impedance mismatch is eliminated and deterioration of the signal light waveform can be prevented.

Further, the variable impedance circuit can be constructed in simple fashion using a semiconductor device, such as a diode or FET, that is turned on and off in dependence upon whether a driving voltage is or is not being applied.

As many apparently widely different embodiments of the present invention can be made without departing from the spirit and scope thereof, it is to be understood that the invention is not limited to the specific embodiments thereof except as defined in the appended claims.

What is claimed is:

1. A driving circuit for an electro-absorption optical modulator for outputting intensity-modulated signal light by receiving carrier light from a light source and absorbing the carrier light in dependence upon a driving voltage, comprising:

a driving unit for applying a pulsed driving voltage to the electro-absorption optical modulator; and a variable impedance unit connected in parallel with the electro-absorption optical modulator for matching impedance with respect to said driving unit;

said variable impedance unit switching its impedance to one value when the driving voltage is applied to the electro-absorption optical modulator and to another value when the driving voltage is not applied to the electro-absorption optical modulator so as to match impedance with respect to said driving unit.

2. The circuit according to claim 1, wherein said driving unit includes:

a constant-current source; and a connection switching circuit which, when the driving voltage is being applied, connects said constant-current source to a point at which said electro-absorption optical modulator and said variable impedance unit are connected in parallel with each other and, when the driving voltage is not being applied, disconnects said constant-current source from said point.

3. The circuit according to claim 1, wherein said variable impedance unit includes a semiconductor device turned on or off depending upon whether the driving voltage is or is not being applied.

4. The circuit according to claim 4, wherein said semiconductor device is a diode.

5. The circuit according to claim 3, wherein said semiconductor device is a field-effect transistor.

* * * * *